United States Patent [19]

Poss

[11] Patent Number: 4,638,954
[45] Date of Patent: Jan. 27, 1987

[54] APPARATUS FOR THE SEPARATION OF MIXTURES OF MATERIALS OF DIFFERENT CONSISTENCIES SUCH AS MEAT AND BONE

[75] Inventor: Werner Poss, Oakville, Canada

[73] Assignee: Poss Design Limited, Hamilton, Canada

[21] Appl. No.: 690,215

[22] Filed: Jan. 10, 1985

Related U.S. Application Data

[63] Continuation-in-part of Ser. No. 513,487, Jul. 13, 1983, abandoned.

[51] Int. Cl.⁴ .................... B02C 19/22; B02C 23/16
[52] U.S. Cl. .................... 241/74; 209/262;
 209/300; 241/89.3; 241/247; 241/260.1
[58] Field of Search .................. 241/73, 74, 29, 152 A,
 241/82.1, 185 A, 260.1, 247, 86, 88, 89.3;
 425/376 B; 209/262, 300, 284; 17/46

[56] References Cited

U.S. PATENT DOCUMENTS

| 619,653 | 2/1899 | Asbury et al. ............... 418/255 |
|---|---|---|
| 746,482 | 12/1903 | Evans ............................ 418/255 |
| 1,196,977 | 9/1916 | Piatt . |
| 2,585,406 | 2/1952 | Reynolds ...................... 418/255 |
| 2,895,162 | 7/1959 | Harris . |
| 2,974,700 | 3/1961 | Waters .......................... 418/255 |
| 3,096,718 | 7/1963 | Anderson .................. 241/185 A X |
| 3,376,976 | 4/1968 | Wallen ........................ 209/300 X |
| 3,995,977 | 12/1976 | Takahasi et al. .............. 418/255 |
| 4,069,980 | 1/1978 | Yarem et al. .................. 241/74 X |

FOREIGN PATENT DOCUMENTS

| 200950 | 12/1958 | Austria . |
|---|---|---|
| 30131 | 6/1981 | European Pat. Off. . |
| 54866 | 12/1889 | Fed. Rep. of Germany . |
| 2235045 | 1/1974 | Fed. Rep. of Germany ...... 418/255 |
| 2407293 | 8/1974 | Fed. Rep. of Germany ...... 418/150 |
| 1020046 | 11/1952 | France ........................ 418/181 |
| 1368221 | 6/1964 | France . |
| 1460403 | 11/1966 | France . |
| 341337 | 1/1931 | United Kingdom .............. 418/181 |
| 591554 | 8/1947 | United Kingdom . |
| 717273 | 10/1954 | United Kingdom .............. 418/181 |
| 910127 | 11/1962 | United Kingdom . |

Primary Examiner—Mark Rosenbaum
Attorney, Agent, or Firm—Hirons, Rogers & Scott

[57] ABSTRACT

Apparatus for the separation of mixtures of materials of different consistencies, such as meat and bone, or sewage containing solid material, comprises a positive displacement pump feeding the pressurized mixture to a separator which can be separate from the pump or an integral part of its structure. The pump comprises a rotary vaned pump with radially-moving vanes of fixed length operating with both their ends always in sealing engagement with the wall of an internal cam also constituting a wall of the pump chamber. The vanes are provided with cutting edges able to shear material such as bone that enters the pump, so that the pump is not jammed thereby.

27 Claims, 17 Drawing Figures

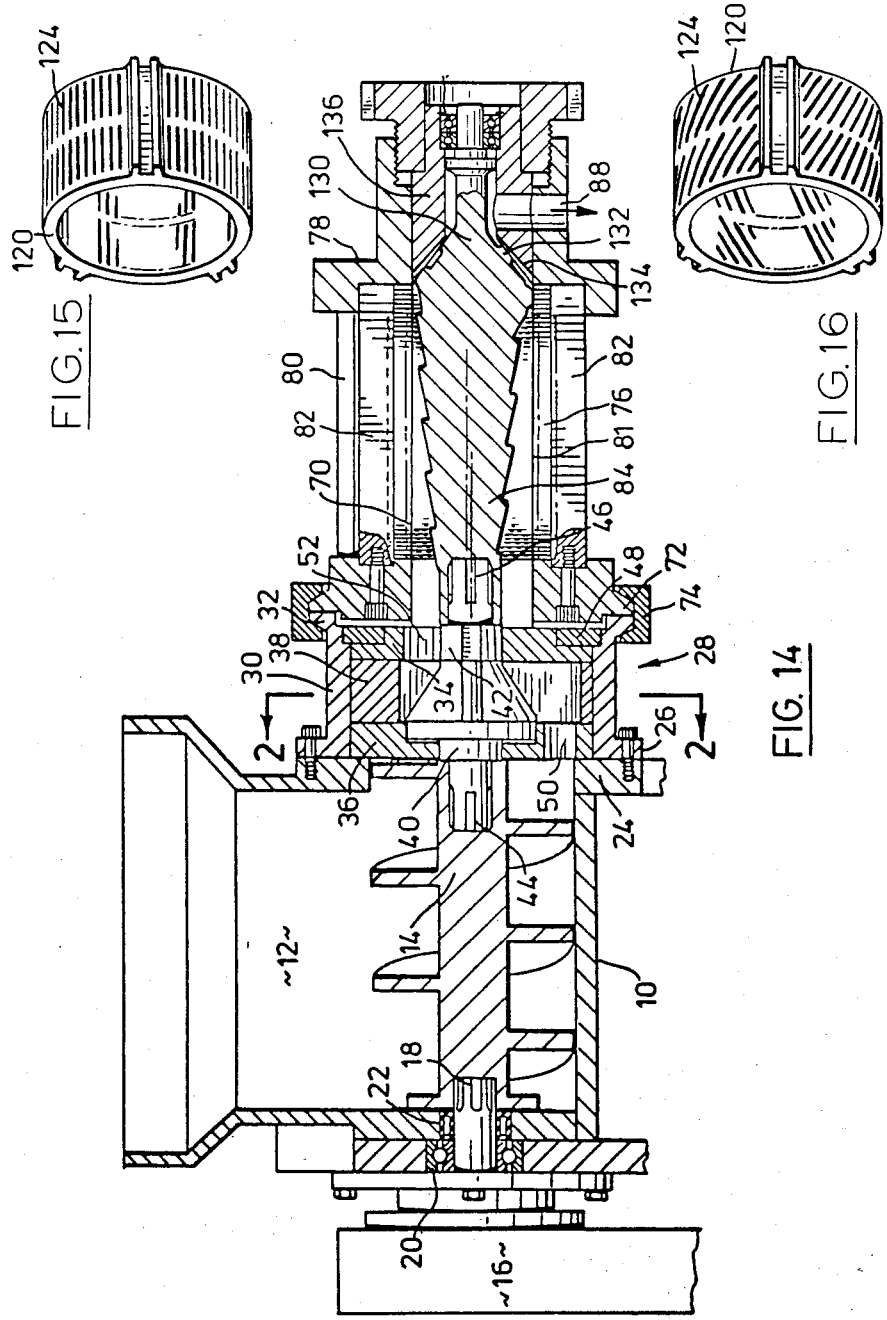

APPARATUS FOR THE SEPARATION OF MIXTURES OF MATERIALS OF DIFFERENT CONSISTENCIES SUCH AS MEAT AND BONE

CROSS-REFERENCE TO RELATED APPLICATION

This application is a continuation-in-part of my earlier application Ser. No. 06/513,487 filed July 13, 1983, now abandoned.

FIELD OF THE INVENTION

The present invention is concerned with apparatus for the separation of mechanical mixtures of materials of different consistencies, such as a mixture of meat and bone, or a mixture of water and solid material such as sewage.

REVIEW OF THE PRIOR ART

Processes and apparatus for the separation of mixtures of materials of different consistencies into component parts are employed in many different industries. For example, in sewage treatment it is necessary at some stage to separate as much as possible of the liquid components of the sewage from the various more solid components, so that they can be subjected separately to appropriate treatments. The presence of the solid components causes considerable difficulty in the handling of the mixtures prior to their separation.

The mechanical separation of mixtures of meat and bone into separate components is now a well-established industry. Although usually the machines were proposed for use with different animal and fish species, in practice the earlier machines were operable most successfully with chicken parts, where the difference in consistencies between the meat and the bone is adequate, but the bones are not too difficult to break without splintering and powdering. Attempts to use the machines with other meats, such as beef, pork and fish, were not as successful. Even with chicken, problems were and still are encountered when attempting to obtain maximum production from a machine, such as too much bone content in the meat fraction, beyond the limits permitted by the licensing authorities, or too great a temperature increase in the meat fraction during separation, resulting in lowering in quality and texture of the separated meat. A separating apparatus that proved particularly commercially successful is described in U.S. Pat. Nos. 4,025,001 and 4,069,980, issued respectively May 24, 1977 and Jan. 24, 1978, while a subsequent machine is described in U.S. Pat. No. 4,340,184, issued July 20, 1982.

DEFINITION OF THE INVENTION

It is the principal object of the invention to provide a new apparatus for the separation of mixtures of materials of different consistencies, such as mixtures of meat and bone.

In accordance with the present invention there is provided apparatus for the separation of mixtures of materials of different consistencies into separate fractions thereof comprising:

an apparatus body having an inlet for the mixture to be separated and respective outlets for the separated fractions, positive displacement pump means constituted by a rotary vaned pump having a pump chamber mounted by the said body receiving the mixture from the inlet into the pump chamber and pressurising it in the pump chamber to an operative separation pressure, separator screen means mounted by the said body against a front face of which the pressurised mixture is delivered for the corresponding first fraction thereof to pass through the screen to a rear face thereof and for the remaining second fraction to be retained by the screen, and means connecting at least one of the front and rear faces of the screen to the respective outlet for the respective separated fractions.

DESCRIPTION OF THE DRAWINGS

Separators which are particular preferred embodiments of the invention will now be described, by way of example, with reference to the accompanying diagrammatic drawings, wherein:

FIG. 14 is a longitudinal cross-section similar to FIG. 1 through a fourth embodiment; and FIGS. 15 and 16 are perspective views respectively of two further forms of separator element for use in the embodiments of FIGS. 1 and 14.

The same references will be used if possible for similar parts in all the figures of the drawings.

DESCRIPTION OF THE PREFERRED EMBODIMENTS

Figure 1:
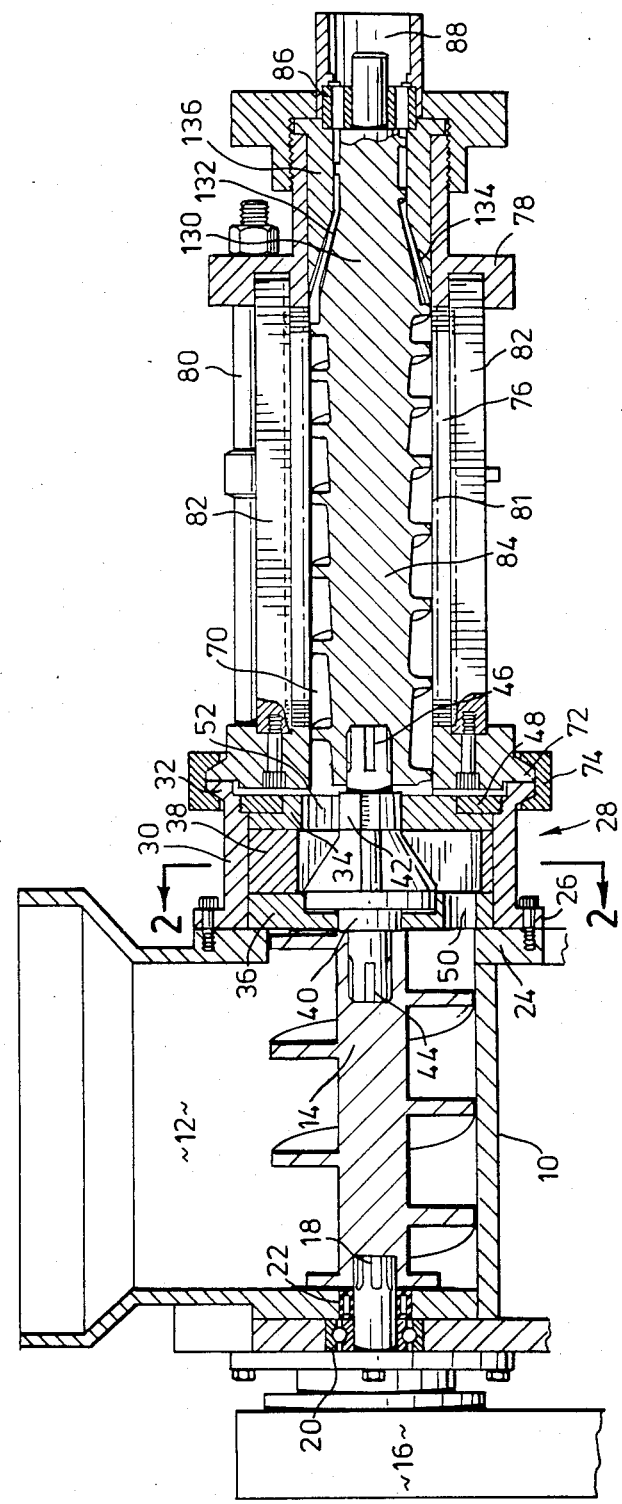
FIG. 1 is a longitudinal cross-section through a first embodiment, in which a positive displacement pump feeds the mixture to be separated to a separate, attached separating unit.

The apparatus of FIGS. 1 through 3A is intended principally for the mechanical separation of various kinds of meats from the bones to which they are attached. A substantial industry has developed, based on the use of such machines, since they are able economically to remove a substantial proportion of edible meat from fowl, animal and fish parts that would otherwise be discarded for food purposes, such as the necks and backs of chickens that have been cut in pieces for separate sale of the legs, breasts and wings. In practice the separation cannot be complete and the separated bone fraction will still contain some meat, while the separated meat fraction will also contain a small amount of bone in the form of tiny particles thereof. Food licensing authorities have instituted strict regulations as to the maximum overall percentage of bone and maximum particle size of the bone that is permitted in the resultant meat products. For example, the regulations of the U.S. Food and Drug Administration permit a maximum bone content of 2% by weight and a maximum bone particle size of 0.5 mm. These standards are difficult to achieve.

The apparatus consists of a frame 10 providing a hopper 12 into which the meat and bone mixture to be separated is delivered. The hopper contains a longitudinal conveyor screw 14 rotated about a horizontal axis by a drive rotor (not shown) via a connecting drive gear 16 and a splined drive output shaft 18 mounted in a bearing 20 in an end plate of the frame. Special bearing seals such as 22 are required, as is well known to those skilled in the art of food handling machinery construction, to prevent entry to the bearings of the body fluids that accompany meats.

Figure 2:
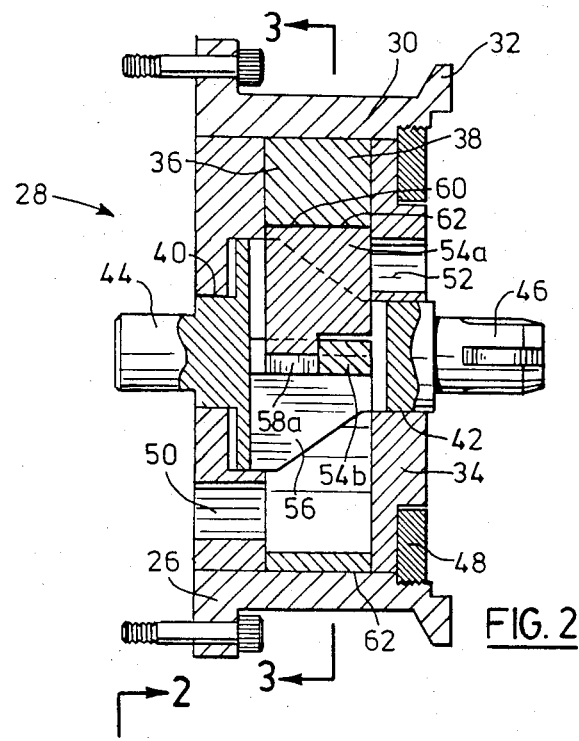
FIG. 2 is a similar cross-section, to a larger scale, through the positive displacement pump of the separator of FIG. 1, in order to show the construction thereof, taken on the line 2—2 in FIG. 3.
Figure 3:
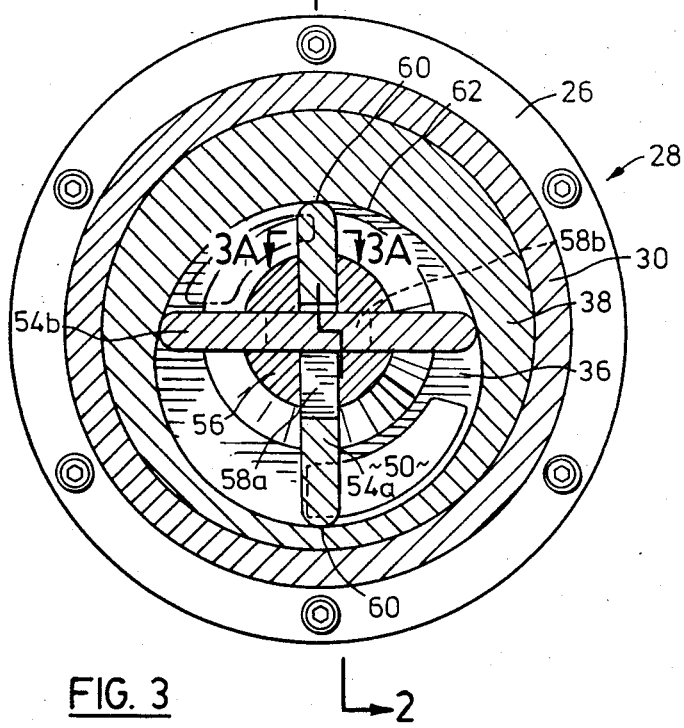
FIG. 3 is a plane cross-section taken on the line 3—3 in FIG. 2.
Figure 3A:
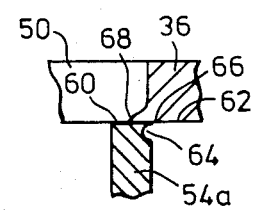
FIG. 3A is a plane cross-section of a detail of a vane of the pump of FIGS. 2 and 3, taken on the line 3A—3A of FIG. 3.

The hopper body is provided with a front end flange 24 to which is fastened the adjacent rear end mounting flange 26 of a rotary, radial-vane, positive-displacement pump indicated generally by the reference 28. Referring now especially to FIGS. 2, 3 and 3A, the pump comprises a cylindrical housing 30 having the rear mounting flange 26 at one end and a comparable front mounting flange 32 at the other end. Front and rear bearing plates 34 and 36 respectively are mounted in the cylindrical housing on either side of a hollow cam plate 38, so that the plates 34, 36 and 38 form a pump chamber between them. The pump rotor is provided with two cylindrical plain bearing portions 40 and 42 that are mounted in respective bores in the bearing plates to support the rotor for rotation about a horizontal axis coaxial with the axis of rotation of the hopper conveyor screw 14. Both ends of the pump rotor protrude from the respective bearing plates and are splined, the rear rotor end 44 engaging in the adjacent end of the conveyor screw 14 to be driven thereby, while the front rotor end 46 engages in the rear end of another conveyor screw to be described below. The assembly of end plates, cam plate and rotor is retained in the housing by a retainer ring 48 screw-threaded into the front end of the housing 30.

A circumferentially elongated axial inlet 50 to the pump chamber is provided in the rear end plate 36 and a circumferentially elongated axial outlet 52 is provided in the front end plate 34, the two openings being disposed diametrically opposed from one another about the axis of rotation of the rotor. The pump has two radially-extending pump vanes or blades 54a and 54b each sliding radially in a respective radial slot in the rotor boss 56, the two slots and therefore the two blades being disposed at right angles to one another. Both blades are of an axial width to fit without appreciable play between the two facing axial faces of the end bearing plates, and they are both provided with mating complementary half-width radially elongated slots 58a and 58b respectively to permit the required radial sliding movements in the rotor boss as it rotates about the axis 58. The tips 60 of the blades engage an internal cam constituted by the inside surface 62 of the bore in the hollow cam plate 38, the tips being rounded to facilitate the rubbing contact as they move over the surface. The surface 62 is generated so that at all times during the rotation of the pump rotor the blade tips are in contact with it, so that the contents of the pump chamber are positively displaced through the pump from the inlet to the outlet, and relatively high pump pressures, e.g. usually from 70–210 Kg/sq. cm (1000–3000 p.s.i.), can readily be generated. The manner in which such a cam surface is determined is described below.

The leading edges of the pump blades adjacent to the rear bearing plate 36 are hollow ground at 64 (FIG. 3A) and hardened to form cutting edges 66. The trailing edge of the inlet 50 is also provided at 68 with a shearing edge that will cooperate with the vane cutting edges 66 to shear any hard material, such as a piece of bone, that protrudes through the inlet 40 into the pump chamber. The bone pieces are moved by the respective blade through the pump chamber and out through the outlet 52. If the bone piece jams in the outlet it will be sheared against the outlet trailing edge 68 by the following blade, the sheared off piece being carried around until it can be expelled at a subsequent passage of the blade over the outlet.

The mixture of meat and bone pieces is fed from the outlet 52 into a separator chamber indicated generally by the reference 70 (FIG. 1). In this embodiment this chamber is constituted by a rear end plate 72 that is secured to the pump front end plate 34 by a circumferential clamp ring 74. The separator chamber provides a cylindrical separator or filter constituted by a large plurality of annular separator plates 76 that are tightly clamped together between the rear end plate 72 and a front end plate 78 by a number of heavy axial circumferentially-spaced tie bolts 80. The separator plates are held aligned with one another to provide a smooth internal cylindrical front face 81 by axial aligning bars 82 engaged in radial slots in the plates. The chamber encloses an elongated feed screw 84 mounted by splined front rotor end 46 and a bearing 86 for rotation about an axis coaxial with the pump axis 58, and driven in such rotation by the rotor end 46. Rotation of the screw 84 conveys the pump-pressurised mixture of meat and bone along the interior of the cylindrical separation chamber 70, the pressure being such that the softer meat tissue is squeezed through the filter 76 to the outside rear separator surface, the filter thus constituting in this embodiment the meat fraction outlet, from which it will fall into a suitable collector receptacle (not shown), while the bone and unseparated meat eventually exit from an annular bone fraction outlet 88 to another respective collector receptacle (also not shown). As is known to these experienced in this art the flow capacity of the filter 76 and of the annular bone fraction outlet must be such that there is sufficient back pressure created, whereby the operative pressure in the separation chamber provided by the pump is maintained within the require range for the mixture undergoing separation. The flow capacity of a specific filter is not easily changed, and it is more usual to change the filter completely; the bone outlet may be of fixed or variable flow capacity. For more details of the construction and operation of this type of separator unit reference may be made to the above mentioned prior U.S. Pat. Nos.

4,025,001; 4,069,980 and 4,340,184, the disclosures of which are incorporated herein by this reference.

The screw 84 is provided next to its discharge end with a portion 130 of reduced diameter provided with moving lands 132 cooperating with stationary lands 134 provided on a topical frusto-conical internal face of a machine part 136. These lands cooperate to form a bone breaker that will break only large pieces if bone in the existing material to ensure that they will not jam the outlet 88.

In the above-described prior apparatus the hopper and separator feed screws, corresponding to the two screws 14 and 84 herein, cooperate to pressurise the mixture of meat and bone to the pressure values mentioned above, which currently are necessary to obtain satisfactory separation without more than the permitted amount of bone being discharged in the softer meat tissue fraction. In the apparatus of the invention this necessary pressurisation is performed predominantly, and in some embodiments solely, by the positive displacement pump 28. The conveyor screws inherently will add a small amount to the pressurisation, but this will not be significant compared to that provided by the pump.

Since the hopper and separator feed screws 14 and 84 are now relieved of the task of pressurising the mixture their design becomes much less onerous and critical. The use of the positive displacement pump, which also acts to break the bones cleanly to suitable size, permits close control of the pressure produced with greatly reduced dependence upon the nature of the mixture and the relative proportions of bone and meat that are present. In the prior art apparatus as represented by those described in the above-mentioned U.S. patents, the screw conveyors had the dual function of pressurising the mixture and also conveying it through the apparatus, and the pressures which the two screws, particularly the separator screw, were able to apply to the mixture depended in a complicated manner on the relative friction between the meat/bone mixture, the screw body and the front face of the separator, and the maximum shear to which the meat or bone could be subjected. The friction also of course differed for different types of meat, and also differed among meats of the same type, depending for example on the proportion of fat present. An optimum condition for good separation is a relatively steady high pressure, but high pressures are difficult to achieve with single screw conveyors. Higher pressures can be obtained with twin screw conveyors, but these are difficult and expensive to design, manufacture and maintain. Attempts to increase the pressure simply by increasing the speed of rotation can easily lead to a situation in which the screw conveyor is shearing the meat without increasing the pressure, resulting in excessive temperature rise and degradation of the quality and texture of the meat fraction.

In the apparatus of the invention the positive displacement pump pressurises the mixture without any substantial shearing, except minor amounts at the entry and exit openings, and the conveyors need only convey the material without pressurisation. The screw conveyor 84 must be of smaller volume between successive lands along its length toward the bone fraction exit 88 to take account of the decrease of product volume radially through the filter. Some adjustment of rotational speed may be desirable to take account of different proportions of meat and bone. Thus, if the proportion of bone is high it would be desirable, though not essential, to employ a higher rotational speed of the conveyor 84 in order to expel the larger quantity of bone and maintain the output of the apparatus as high as possible.

Figure 5:
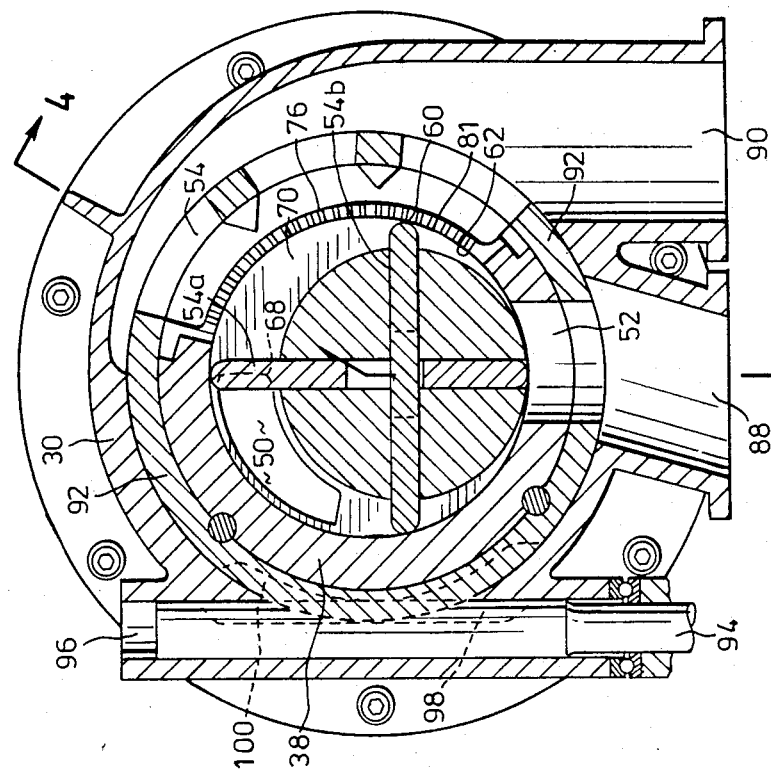
FIG. 5 is a transverse cross-section of the embodiment of FIG. 4, taken on the line 5—5 in FIG. 4.
Figure 4:
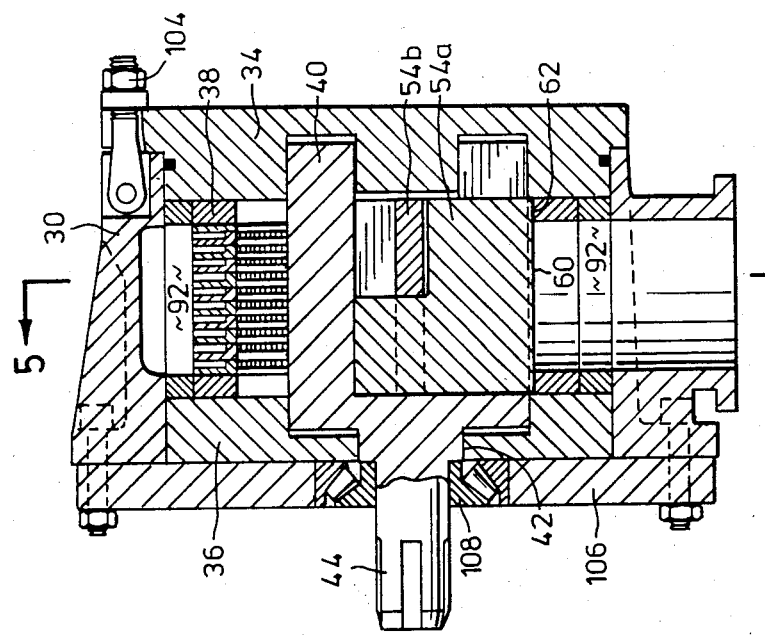
FIG. 4 is a longitudinal cross-section through a second embodiment, in which the separating unit is an integral part of the positive displacement pump, the section being taken on the line 4—4 in FIG. 5.

FIGS. 4 and 5 illustrate a second embodiment in which the positive displacement pump 28 has an axial inlet as with the pump of the apparatus of FIGS. 1 to 3, but has two radial outlets from the pump chamber in the circumferential wall thereof, one of which is constituted by circumferential filter element segments 76 through which the separated meat fraction is expressed to a corresponding outlet 90 from the casing 30, and the other of which is the outlet 88 for the bone fraction. This embodiment therefore provides an exceptionally compact form of the apparatus. The apparatus is also suited to any other application in which at least some separation is required from a mixture into two components of different consistencies, for example some dewatering of a sludgy material.

In this embodiment the hollow cam plate 38 has an arc of its wall constituted by the separator elements 76 and is mounted in an annular support member 92, which is in turn rotatably mounted in the housing 30 for rotation about the axis of rotation of the rotor. The cam plate can therefore be rotated relative to the rotor to adjust the timing of the cam and the location of the outlet 88 relative to the point of minimum volume of the chamber 70 defined by the cam, so as to take account of differences in the relative volumes of the two fractions to be produced by the apparatus. In this embodiment the rotation of the cam plate is effected by a shaft 94 mounted in a bore 96 of the housing for longitudinal movement under the control of a linear operating rotor device (not shown) such as a hydraulic piston and cylinder motor. The shaft 94 is provided at 98 with rack teeth which mesh with cooperating rack teeth that extend over a sector 100 of the outer periphery of the support member 92. The outlets 88 and 90 in the casing 30 for the two separated fractions are of greater circumferential extent than the corresponding outlets 52 and separator 76 to be able to accommodate this rotation of the cam plate.

Since the apparatus is not required to drive any other piece of apparatus the end plate 34 provides an annular bearing for the adjacent rotor end and is secured to the casing 30 by quick release bolts 104. At the other side the apparatus is provided with an end closure plate 106 bolted to the casing 30 and supporting a thrust bearing 108. The support member 92 completely encloses the cam plate 38 and in so doing also serves to retain in position the separator elements 76 against the relatively high radially outwardly acting pressure of the material passing through it.

Figure 7:
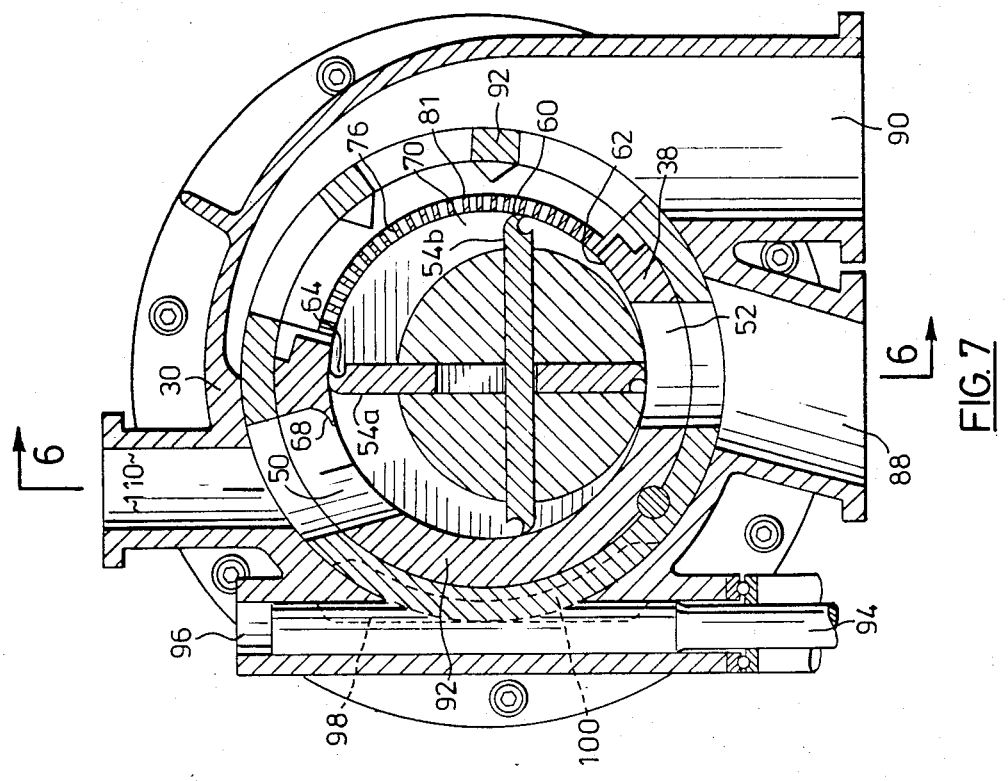
FIG. 7 is a transverse cross-section taken on the line 7—7 in FIG. 6.
Figure 6:
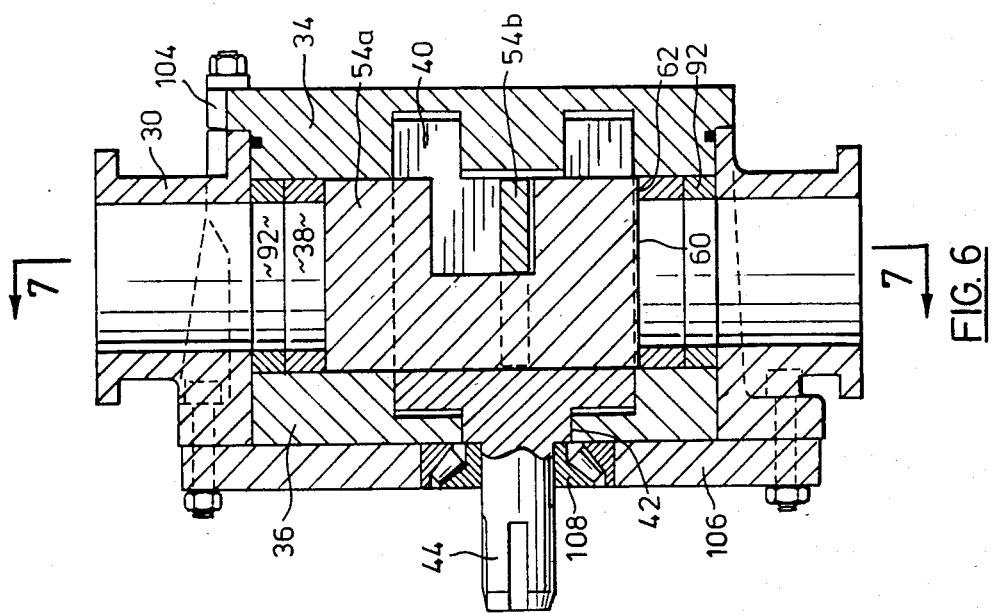
FIG. 6 is a longitudinal cross-section through a third embodiment, again in which the separating unit is an integral part of the positive displacement pump, the section being taken on the line 6—6 in FIG. 7.

The embodiment of FIGS. 6 and 7 is functionally similar to that of FIGS. 4 and 5, the essential difference being that the inlet 50 to the pump chamber and the associated inlet 110 to the casing 30 are both radial. The hollow ground portions and associated shearing knife edges must therefore be provided at the tips of the vane blades.

Figure 10:
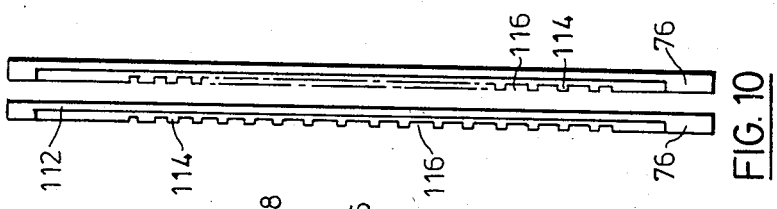
FIGS. 9 and 10 are respective side elevations of two different groups of separator elements for use in the embodiments of FIGS. 4 through 7.
Figure 9:
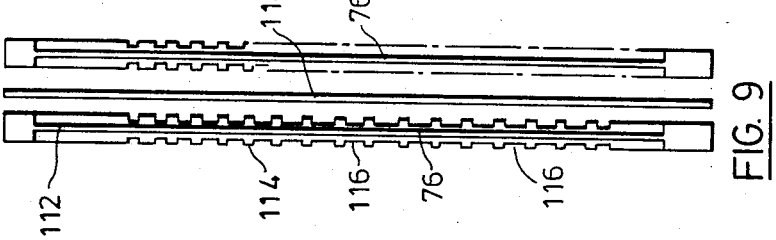
Figure 8:
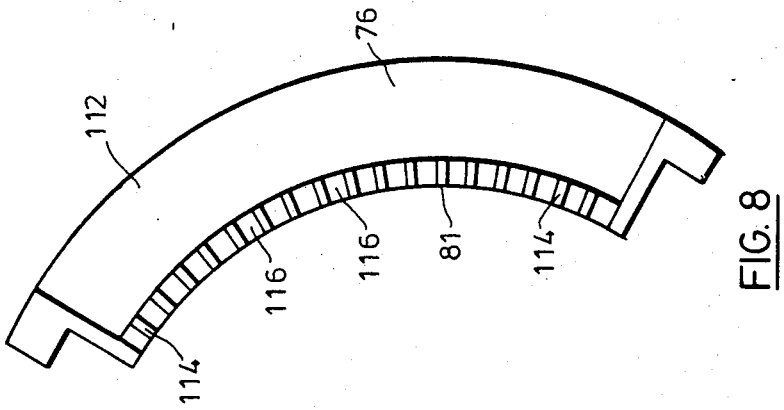
FIG. 8 is a front elevation of a separator element for use in the embodiments of FIGS. 4 through 7.

FIG. 8 shows in greater detail a structure for the arcuate separator element 76 as employed in the embodiments of FIGS. 4 through 7, as seen in side elevation, while FIGS. 9 and 10 show different forms of element in end elevation. With the form of element illustrated by FIGS. 8 and 9, each element comprises a central web 112 that remains from the removal of material from a thick plate to leave a narrow arcuate radially-inner portion 114. This portion 114 is provided with radial slots 116 through which the separated softer component flows, while the harder component is moved by the vane blades over the separator inner surface 81, which in this embodiment, at this part of the chamber, also constitutes part of the cam surface 62. A plurality of such elements are assembled together and tightly packed with plain flat spacing elements 118 between each two adjacent elements.

Figure 12:
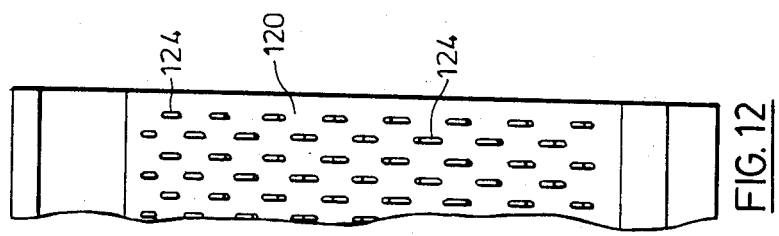
FIGS. 11 and 12 are respective front elevations of portions of a unitary separator element for use in the embodiments of FIGS. 4 through 7.
Figure 11:
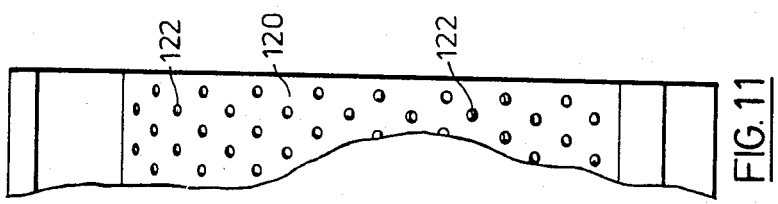

In the embodiment illustrated by FIGS. 8 and 10 together the portion 114 is left at one side only of the element and the slots 116 are formed in this one side, so that the elements can be packed tightly together without the need for intermediate plain flat elements. FIGS. 11 and 12 show unitary filter structures 120 that can be used in place of the stack of elements consisting of a suitably fashioned sheet provided with a large plurality of round holes 122 (FIG. 11) or slots 124 (FIG. 2) elongated in the direction of movement of the rotor blades.

Figure 13:
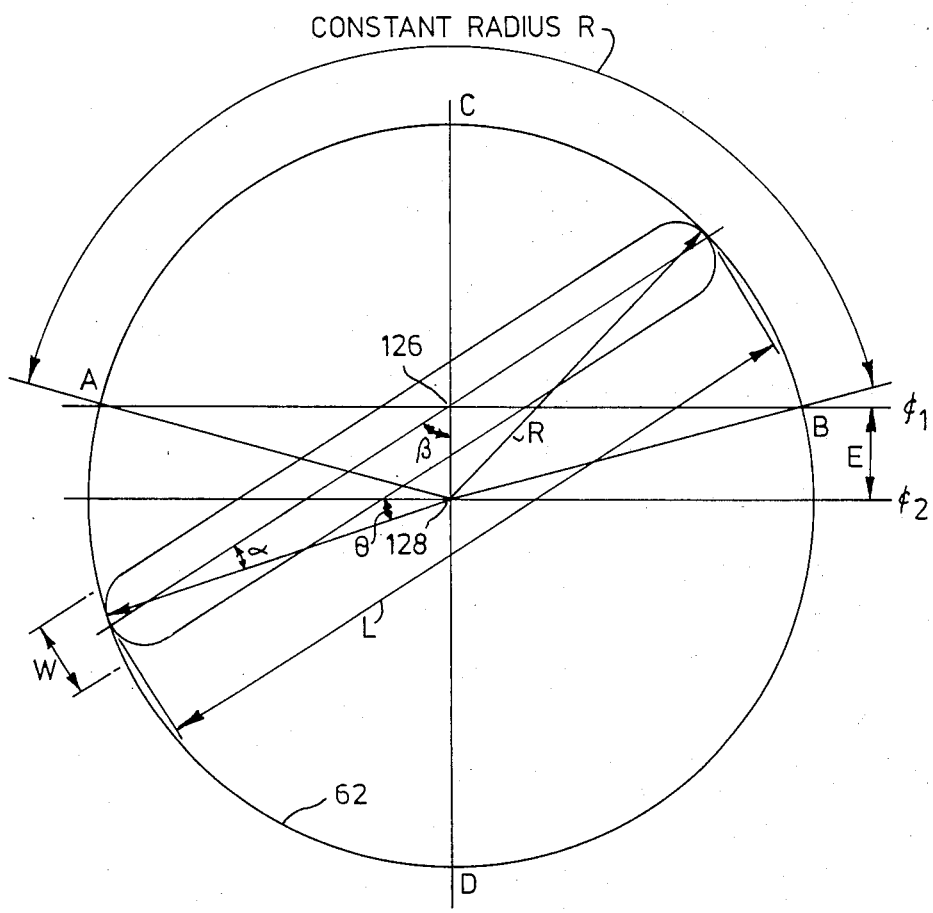
FIG. 13 is an outline diagram of the internal cam face of the positive displacement pump in side elevation and a rotor blade to accompany a description of a manner of calculating the cam face profile to permit its manufacture.

FIG. 13 is an outline diagram of the internal cam face 62 of the cam plate 38 and illustrates one manner of calculating the necessary cam face profile. The figure shows diagrammatically the side elevation of the cam face 62 and a single vane 54a stopped in one position. The diagram shows the centre line $\phi_1$ of the rotor having its centre of rotation at 126, and the centre line $\phi_2$ of the cam having its centre of rotation at 128. The distance between the two centres is the eccentricity E which is known. The blade length L and thickness W are also known. The centre line of the blades must always pass through the centre 126 while the eccentricity E is directly proportional to the volume output of the pump and locates the imaginary centre 128 of the cam. The rotor blades must seal the spaces between the rotor blades at all times, and therefore must at all times and in all positions of the rotor be in touch with the cam at both ends.

It is arbitrarily chosen that the maximum arc shall be of constant radius R, and this is the arc ACB centered at 128 with chord equal to the blade length L. Some correction must be made to L to account for the thickness of the blade and for the rounded tips of radius W/2. The variable cam radius r measured from centre 128 will vary with the angle 0 and can be calculated geometrically, but an exact equation solution is not easily attainable. The problem is particularly suited to an iterative approach, especially with the use of a computer to effect the relatively large number of calculations required to obtain the values of the cam radius necessary for the required accuracy of manufacture.

A value known to be a practical value is assumed for the angle between the blade centre line and a radius through the centre 128. Angle $\beta$ can then be determined for any subsequent value of knowing that the sum of angles $+\beta+0$ must be 90 degrees. The values of variable cam radius r can then be calculated from the relationships $$\frac{\left(r - \frac{W}{R}\right)}{\sin \beta} = \frac{E}{\sin} \quad (1)$$

$$\left(R - \frac{W}{2}\right)^2 = \left(r - \frac{W}{2}\right)^2 + (L - W)^2 - \quad (2)$$

-continued $$2\left(r - \frac{W}{2}\right)(L - W)\cos$$

both of which must be satisfied. If the agreement is not within the required tolerance must be adjusted and the procedure repeated until it is. All of the points on the non-constant radius arc ADB can be calculated using the different values of O involved.

Other forms of rotary vaned pumps may also be employed in which the vanes are of fixed length, for example a pump of the type in which the vanes are mounted in radial slots in the rotor with their parallel largest faces parallel to the axis of rotation; the two radially-extending edges of each vane engage complementary face cams on the two facing end walls and, as the rotor rotates, cause the vanes to slide axially of the rotor in their radial slots to vary cyclically the volumes of the chambers formed between the rotor and the end wall face cams. The shearing knife edge will, as with the previously-described embodiments, be provided at the edges which traverse the inlet aperture. However, such a structure requires the accurate production of two complementary face cams and their subsequent assembly facing one another and spaced accurately apart, so that the resulting construction is substantially more expensive than those described above.

Another embodiment of the invention is illustrated by FIG. 14, which is similar to the embodiment of FIGS. 1–3. Since, as explained above, the screw 84 is no longer required to pressurise the mixture in the chamber 70, it can be made somewhat shorter in length and substantial clearances can be provided between its exterior surface and 10 the interior surface of the separator elements 76. In this embodiment the screw is designed and arranged to apply a pulsating radially-outwardly-acting force to the mixture which will facilitate the passage of the meat component through the separator screen, and hence the separation. To this end the screw profile is formed to be radially eccentric about the longitudinal axis of rotation. The screw tapers outwardly from the pump outlet 52 to the separator outlet 88 in order to take account of the progressive reduction in the volume of the mixture, but the screw lands are much reduced in radial extent as compared with the embodiment illustrated by FIG. 1, where the screw lands just clear the interior walls of the separator elements 76. In this embodiment the screw portion 130 is provided with moving bone-breaking means 132 which cooperate with a smooth frusto-conical wall of the machine paid 136 to perform there bone-breaking function.

This large spacing between the land tips and the separator screen reduces the possibility of pieces of the harder component being forced through the screen slots or jammed in the slots. In a specific example of an apparatus in which the diameter of the chamber 70 is 15 cm (6 in.) the clearance between the tips of the vestigial lands and the cylindrical interior wall can be as much as 9.5–19 mm (0.375–0.75 in.), the spacing of course varying as the screw rotates because of the eccentricity. In this embodiment the outlet 88 for the harder fraction is radial from the chamber 70.

The separator means described in relation to FIGS. 1–10, 12 and 14 provide circumferentially extending elongated slots through which the softer fraction (the meat fraction) is expressed. The mixture is moved within the chamber 70 both longitudinally and circumferentially thereof, so that the mixture is moved across the slots with a certain degree of shearing action. Round apertures 122 as employed in the embodiment of FIG. 11 are multi-directional, but the size of hole that can be used is severely limited by the requirement as to the size of solid particles that can be present in the softer fraction. It is therefore preferred to use elongated slots which are both easier to form by cutting or milling and also provide for greater through-put of the apparatus. With some embodiments therefore it may be preferred to use a separator element 76 as illustrated by FIG. 15, which is cylindrical and is provided with longitudinally-extending slots 124; a number of such elements will be assembled end to end and held in place via bars 82.

Such a cylindrical separator element 76 may also take the form illustrated by FIG. 16, in which elongated slots 124 are disposed at a transverse angle such that they extend both longitudinally and transversely, the angle being determined to match as closely as possible the actual direction of movement of the material in the chamber 70 and minimize shearing between the mixture and the long slot edges. Minimum shearing is desired, especially in apparatus for the separation of meat and bone, since excessive shear can have a deleterious effect upon the quality of the separated softer material. It will be understood that different transverse angles will be optimum for different mixtures to be separated.

I claim:

1. Apparatus for the separation of a composite mixture of different materials of different consistencies into separate fractions of the different consistencies comprising:
   an apparatus body having an apparatus inlet for the composite mixture to be separated and respective outlets for the separated fractions,
   a rotary vaned pump having a pump compartment mounted by the said body, the pump compartment having an inlet thereto receiving the mixture from the apparatus inlet into the pump compartment and the pump pressurising it in the pump compartment to an operative separation pressure,
   said rotary vaned pump having a pump rotor carrying at least one vane rotatable about a rotor axis, said one vane being mounted in a respective radially-extending slot in the rotor and moving radially therein as the rotor rotates, and defining at least two pump chambers in the pump compartment, said pump chambers being formed about a chamber longitudinal axis radially displaced from said rotor axis so that each pump chamber decreases in volume as the pump vane moves from the pump means inlet toward the pump means outlet and increases in volume as the pump vane moves from the outlet towards the inlet,
   separator screen means mounted by the said body against a front face of which the pressurised mixture is delivered for the corresponding softer first fraction thereof to pass through the screen to a rear face thereof and for the remaining second harder fraction to be retained by the screen, and
   means connecting at least the front face of the screen to a respective outlet for the respective separated second harder fraction,
   said separator screen means and the outlet for the second harder fraction maintaining the pressure of the pressurized mixture at an operative separation pressure.

2. Apparatus as claimed in claim 1, wherein the said pump vane extends on opposite sides of the pump rotor axis and is of fixed radial length, and wherein the pump compartment has a curved interior surface constituting an interior cam face for moving the pump vane radially relative to the pump rotor as the rotor rotates, said vane having its axial edges in operative contact with the said interior cam face for radial movement thereby as the pump rotor rotates.

3. Apparatus as claimed in claim 2, wherein the said separator screen means comprises at least part of a circumferential wall of the pump compartment providing the curved interior surface constituting an interior pump cam face, wherein the said wall is mounted for rotation about the axis of rotation of the rotor, and there are provided means for rotating the wall about the said axis for adjusting the timing of the pump cam.

4. Apparatus as claimed in claim 2, wherein the said separator screen means comprises at least part of the circumferential wall of the pump compartment providing the said circumferential interior cam face.

5. Apparatus as claimed in claim 4, wherein the said circumferential wall of the pump is mounted for rotation about the axis of rotation of the rotor, and there are provided means for rotating the wall about the said axis for adjusting the timing of the pump cam.

6. Apparatus as claimed in claim 2, wherein the pump includes two pump vanes mounted on the pump rotor transverse to one another, both vanes being of fixed radial length and each pump vane extending on both sides of the pump rotor longitudinal axis and having both its radial edges in operative contact with the interior cam face.

7. Apparatus as claimed in any one of claims 1, 2 or 6, wherein shearing means is provided by the leading radial edge of each pump vane, said leading radial edge being formed as a shearing knife edge for shear cutting any shear-cuttable solid material passing through the pump compartment inlet.

8. Apparatus as claimed in any one of claims 1, 2 or 6, wherein shearing means is provided by the leading radial edge of each pump vane, said leading radial edge being hollow ground to form a shearing knife edge for shear cutting any shear-cuttable solid material passing through the pump compartment inlet.

9. Apparatus as claimed in any one of claims 1, 2 or 6, wherein the leading face of each pump vane leading edge that passes over an inlet opening to the pump compartment is formed as a shearing knife edge for shear cutting any shear-cuttable solid material entering the pump compartment through the pump compartment inlet and engaged by the shearing knife edge, and wherein an edge of the said pump compartment inlet facing the said pump vane leading edge is formed as a shearing edge and cooperates with the pump vane shearing knife edge to shear cut solid material interposed between them as such material passes through the opening.

10. Apparatus as claimed in any one of claims 1, 2 or 6, and comprising:
    a hopper for receiving the composite mixture to be separated, said hopper having an outlet communicating with the inlet of the pump compartment,
    a conveyor screw rotatably mounted within the said hopper feeding the mixture to the hopper outlet, and
    means for rotating the conveyor screw.

11. Apparatus as claimed in any one of claims 1, 2 or 6, comprising:
   fraction separating means having at least a part of a wall thereof constituted by the said separator screen means, which separator screen means also constitutes the first outlet for said first softer fraction;
   the apparatus also comprising means connecting the interior of the fraction separating means to the interior of the pump compartment for delivering the pressurised mixture of material from the pump compartment interior to the fraction separating means interior;
   a conveyor screw rotatably mounted within the fraction separating means for conveying the pressurised mixture towards the second outlet therefrom for the second harder fraction, the softer fraction being forced through the separator screen means as the mixture is conveyed and the harder fraction exiting at said second outlet; and
   means for rotating the conveyor screw.

12. Apparatus as claimed in claim 11, wherein said conveyor screw has substantial clearance between its exterior surface and the cooperating interior surface of the fraction separating means.

13. Apparatus as claimed in any one of claims 1, 2 or 6, comprising:
   fraction separating means having at least a part of a wall thereof constituted by the said separator screen means, which separator screen means also constitutes the first outlet for said first softer fraction;
   the apparatus also comprising means connecting the interior of the fraction separating means to the interior of the pump compartment for delivering the pressurised mixture of material from the pump compartment interior to the fraction separating means interior;
   a conveyor screw rotatably mounted within the fraction separating means for conveying the pressurised mixture towards the second outlet therefrom for the second harder fraction, said softer fraction being forced through the separator screen means as the mixture is conveyed and the harder fraction exiting at said second outlet;
   means for rotating the conveyor screw, and
   wherein the said separator screen means is provided with elongated transverse angled slots through which the respective separated softer fraction passes, the transverse angle of the slots corresponding to the direction of movement of the material in the fraction separating means by the conveyor screw.

14. Apparatus as claimed in any one of claims 1, 2 or 6, wherein the said separator screen means comprises at least part of a wall of the pump compartment.

15. Apparatus as claimed in any one of claims 1, 2 or 6, comprising:
   fraction separating means having at least a part of a wall thereof constituted by the said separator screen means, which separator screen means also constitutes the first outlet for said first softer fraction;
   the apparatus also comprising means connecting the interior of the fraction separating means to the interior of the pump compartment for delivering the pressurised mixture of material from the pump compartment interior to the fraction separating means interior;
   a conveyor screw rotatably mounted within the fraction separating means for conveying the pressurised mixture towards the second outlet therefrom for the second harder fraction, the softer fraction being forced through the separator screen means as the mixture is conveyed and the harder fraction exiting at said second outlet;
   means for rotating the conveyor screw; and
   shearing meads before and in the vicinity of said outlet of the fraction separation means to shear to a smaller size the harder material of the harder fraction to permit it to pass through said outlet.

16. Apparatus for separating materials of different consistencies from a composite mixture thereof into separate fractions of different consistencies comprising,
   a rotary vaned pump having a pump compartment having an inlet for receiving the composite mixture, and an outlet for expelling said composite mixture, said pump being operable at a pressure sufficient to permit separation of the mixture into separate fractions,
   said pump having a pump rotor mounted in the pump compartment carrying at least one vane rotatable about a rotor axis, said one vane being mounted in a respective radially-extending slot in the rotor and moving radially therein as the rotor rotates, and defining at least two pump chambers, said pump chambers being formed about a chamber longitudinal axis radially displaced from said rotor axis so that each pump chamber formed by the pump vane decreases in volume as the pump vane moves from the pump means inlet toward the pump means outlet and increases in volume as the pump vane moves from the outlet towards the inlet,
   fraction separation means having an inlet for receiving said pressurized composite mixture from the pump compartment outlet, said fraction separation means having filter screen means for separating a softer fraction from the mixture by passage of the softer fraction therethrough and constituting a first outlet therefrom and having second outlet means for discharging from the fraction separation means a harder fraction retained by the filter screen means,
   conveyor means within said fraction separation means for conveying said pressurized mixture from the inlet past said filter screen means, said filter screen means and said separation means outlet being proportioned such that a back pressure is created in said pump means and in said separation means sufficient to separate said softer fraction from the harder fraction in said fraction separation means by forcing said softer fraction through said filter screen means, and
   shearing means before and in the vicinity of said outlet of the fraction separation means to shear to a smaller size the harder material of the harder fraction to permit it to pass through said outlet.

17. Apparatus as claimed in claim 16, wherein the pump compartment is bounded by two axially spaced parallel flat end surfaces provided by respective pump end members having respective bearing means for supporting the pump rotor for rotation, and a curved tubular surface provided by an intermediate pump member between said two flat surfaces, the curve of said tubular surface being related to said pump compartment and rotor axis and defining a non-circular surface which is contacted by both ends of the rotor vane and which causes said rotor vane to move radially relative to the rotor as the pump rotates.

18. Apparatus as claimed in claim 17, wherein, the intermediate pump member providing the tubular surface is rotatable about the rotor axis, to vary the space between the rotor and the pump compartment outlet such that back pressure created in the respective pump chamber is varied.

19. Apparatus as claimed in claim 17, wherein said pump compartment inlet is provided in one flat end surface of the pump, said rotor has two vanes mounted transverse to one another, and radial edges of said vanes adjacent said inlet-provided flat surface are formed as respective shearing knife edges for shearing shearable material passing through said pump compartment inlet.

20. Apparatus for separating materials of different consistencies from a composite mixture thereof into separate fractions of different consistencies comprising:
   a rotary vaned pump having an inlet for receiving said mixture to be separated, and a pump compartment connected to the inlet to receive composite mixture therefrom,
   said pump having a pump rotor mounted in the pump compartment carrying at least one vane rotatable about a rotor axis, said one vane being mounted in a respective radially-extending slot in the rotor and moving radially therein as the rotor rotates, and defining at least two pump chambers, said pump chambers being formed about a chamber longitudinal axis radially displaced from said rotor axis so that each pump chamber formed by the pump vane decreases in volume as the pump vane moves from the pump means inlet toward the pump means outlet and increases in volume as the pump vane moves from the outlet towards the inlet,
   the pump compartment being bounded by two axially spaced parallel flat end surfaces provided by respective pump end members having respective bearing means for supporting the pump rotor for rotation, and a curved tubular surface provided by an intermediate pump member between said two flat surfaces, the curve of said tubular surface being related to said pump compartment and rotor axis and defining a non-circular surface which is contacted by both ends of the rotor vane and which causes said rotor vane to move radially relative to the rotor as the pump rotates,
   shearing means at the pump inlet for shearing the portion of said mixture entering the pump inlet and engaged by the shearing means, said shearing means consisting of the opposite axial edges of the vanes adjacent said tubular surface each formed a respective shearing knife edge,
   filter screen means formed by part of the said tubular surface receiving composite mixture from the positive displacement pump means for separating a fraction of a softer consistency from said mixture,
   outlet means downstream of said filter screen means for receiving a fraction of a harder consistency separated from said structure, said filter screen means and said outlet means being proportioned to create a back pressure in said pump chamber sufficient to cause separation of said softer fraction from the harder fraction by passage of the softer fraction through the filter screen means.

21. Apparatus for separating meat from bone comprising,
   positive displacement pump means having a pump inlet for receiving a mixture of meat and bone into the pump compartment, and a pump outlet for expelling said composite mixture of meat and bone out of the pump compartment, said positive displacement pump means consisting of a rotary vaned pump having a pump rotor carrying at least one vane rotatable about a rotor axis, said one vane being mounted in a respective radially-extending slot in the rotor and moving radially therein as the rotor rotates, and defining at least two pump chambers in the pump compartment, said pump chambers being formed about a chamber longitudinal axis radially displaced from said rotor axis so that each pump chamber decreases in volume as the pump vane moves from the pump means inlet toward the pump means outlet and increases in volume as the pump vane moves from the outlet towards the inlet,
   separation means having a separation means inlet for receiving pressurized meat/bone mixture from the pump outlet which is at a pressure sufficient to permit separation of the meat and the bone, said separation means having filter screen means for separating the meat from the bone and outlet means for discharging the separated bone,
   conveyor means within said separation means for conveying said pressurized mixture from the inlet of the separation means past said filter screen means, said conveyor means consisting of a screw conveyor mounted within said separation means and having substantial clearance between its exterior surface and the cooperating interior surface of the filter screen means, said filter screen means and said separation means outlet being proportioned such that a back pressure is created in said pump means and in said separation means sufficient to separate meat from bone by forcing said meat through said filter screen means.

22. Apparatus as claimed in claim 21 including:
   a hopper for receiving the mixture to be separated, said hopper having an outlet communicating with the inlet of the positive displacement pump means,
   a conveyor screw rotatably mounted within the said hopper feeding the mixture to the hopper outlet, and
   means for rotating the hopper conveyor screw.

23. Apparatus as claimed in claim 21, wherein said positive displacement pump means including shearing means for shearing any shearable material passing through said pump inlet and engaged by the shearing means to a preselected size, said shearing means consisting of edges of the pump vane that pass over the pump compartment inlet.

24. Apparatus as claimed in claim 21, and including shearing means before and in the vicinity of said outlet of the separation means to shear to a smaller size bone of said preselected size for passing through said separation means outlet.

25. Apparatus for separating fractions of different consistencies from a composite mixture thereof comprising:
   positive displacement pump means constituted by a rotary vaned pump having a pump inlet for receiving said mixture, said pump including shearing means for shearing shearable material in said mixture passing through the pump inlet and engaged by the shearing means to a preselected size, the pump having a first pump outlet for discharging a first fraction of softer consistency from the mixture, and a second pump outlet for discharging a second fraction of harder consistency from the mixture, said pump having an interior pump chamber defined by two axially spaced parallel flat end surfaces provided by respective pump end members having respective bearing means for supporting the pump rotor for rotation, and a curved tubular surface provided by an intermediate pump member between said two flat surfaces, the rotor including vanes adapted to be moved by engagement with said curved tubular surface as the rotor rotates, the curve of said tubular surface being related to said pump compartment and rotor axis and defining a non-circular surface which is contacted by both ends of the rotor vane and which causes said rotor vane to move radially relative to the rotor as the pump rotates, and filter screen means for separating the softer first fraction from the harder second fraction by passage of the softer first fraction therethrough, said filter screen means forming part of the interior curved tubular surface of the pump compartment and constituting the said first pump outlet, said rotor means constituting means effective to positively convey said mixture from the pump inlet past the filter screen means to the second pump outlet, the second pump outlet and the filter screen means together producing a back pressure in the pump chamber sufficient to force the softer fraction through the filter screen means as the rotor means rotate to convey the mixture past the filter screen means, said harder fraction being passed by the rotor means to the second pump outlet.

26. Apparatus as claimed in claim 25, wherein the pump vane leading edges that pass over the pump inlet are hollow ground to form said shearing means.

27. Apparatus as claimed in claim 26, wherein an edge of the said pump inlet facing the pump vane leading edges formed as respective knife edges is formed as a shearing edge and cooperates with the pump vane shearing knife edges to shear hard material as it passes through the pump inlet.

* * * * *